US008595821B2

(12) United States Patent
Desai et al.

(10) Patent No.: US 8,595,821 B2
(45) Date of Patent: Nov. 26, 2013

(54) DOMAINS BASED SECURITY FOR CLUSTERS

(75) Inventors: Saurabh Desai, Austin, TX (US); George Mathew Koikara, Bangalore (IN); Pruthvi Panyam Nataraj, Bangalore (IN); Guha Prasad Venkataraman, Chennai (IN); Vidya Ranganathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 13/006,634

(22) Filed: Jan. 14, 2011

(65) Prior Publication Data

US 2012/0185930 A1 Jul. 19, 2012

(51) Int. Cl.
*G06F 9/00* (2006.01)

(52) U.S. Cl.
USPC .......................................................... 726/13

(58) Field of Classification Search
USPC .......................................................... 726/13
See application file for complete search history.

(56) References Cited

U.S. PATENT DOCUMENTS

| | | | |
|---|---|---|---|
| 5,666,519 A | 9/1997 | Hayden | |
| 5,845,129 A | 12/1998 | Wendorf et al. | |
| 5,864,683 A | 1/1999 | Boebert et al. | |
| 5,889,952 A | 3/1999 | Hunnicutt et al. | |
| 6,292,494 B1 * | 9/2001 | Baker et al. | 370/459 |
| 6,519,647 B1 | 2/2003 | Howard et al. | |
| 7,017,183 B1 | 3/2006 | Frey et al. | |
| 7,200,869 B1 * | 4/2007 | Hacherl et al. | 726/27 |
| 7,591,015 B2 | 9/2009 | Cargille et al. | |
| 8,107,973 B1 | 1/2012 | Sjothun | |
| 2002/0188738 A1 * | 12/2002 | Gray | 709/229 |
| 2003/0009685 A1 | 1/2003 | Choo et al. | |
| 2003/0041154 A1 | 2/2003 | Tran | |
| 2004/0243835 A1 | 12/2004 | Terzis et al. | |
| 2005/0188173 A1 | 8/2005 | Hasbun et al. | |
| 2005/0273851 A1 | 12/2005 | Raju Datla et al. | |
| 2006/0259487 A1 | 11/2006 | Havens et al. | |

(Continued)

FOREIGN PATENT DOCUMENTS

WO WO2009023586 2/2009

OTHER PUBLICATIONS

U.S. Appl. No. 13/006,618, filed Jan. 14, 2011, Desai, Saurabh et al.
U.S. Appl. No. 13/006,621, filed Jan. 14, 2011, Desai, Saurabh.

(Continued)

*Primary Examiner* — Kambiz Zand
*Assistant Examiner* — Teshome Hailu
(74) *Attorney, Agent, or Firm* — DeLizio Gilliam, PLLC

(57) ABSTRACT

Domains can be used to secure resources of a cluster. An administrator can configure a node of a cluster as a member of a particular domain. Membership in a cluster can be restricted to nodes that are members of the particular domain. When a node generates a cluster message, a kernel process or operating system process of the node will indicate the domain(s) of the node in the cluster message. The cluster message can be a command message to read or write to a storage resource of the cluster. When the cluster storage resource node or node that controls the storage resource receives the command message, the node will examine the command message to ensure the message indicates a domain that aligns with the cluster. If the proper domain is indicated in the command message, then the command message is processed. Otherwise, the command message is denied.

13 Claims, 5 Drawing Sheets

(56) References Cited

U.S. PATENT DOCUMENTS

| | | |
|---|---|---|
| 2007/0011136 A1 | 1/2007 | Haskin et al. |
| 2007/0039045 A1 | 2/2007 | McKee et al. |
| 2007/0121632 A1 | 5/2007 | Zabarski |
| 2007/0214497 A1 | 9/2007 | Montgomery et al. |
| 2008/0071804 A1 | 3/2008 | Gunda et al. |
| 2010/0162362 A1 | 6/2010 | Battle et al. |
| 2010/0290475 A1 | 11/2010 | Belanger et al. |
| 2011/0153975 A1 | 6/2011 | Accapadi et al. |
| 2011/0161644 A1 | 6/2011 | Nojiri et al. |
| 2012/0185581 A1 | 7/2012 | Desai et al. |
| 2012/0185661 A1 | 7/2012 | Desai et al. |

OTHER PUBLICATIONS

U.S. Appl. No. 13/006,626, filed Jan. 14, 2011, Desai, Saurabh et al.

Abdullah, Ariff et al., "FreeBSD Handbook", Chapter 13, Section 8, http://www.freebsd.org/doc/en/books/handbook/users-groups.html (Date Obtained from the Internet: Aug. 25, 2010) 2010 , 2 pages.

Barkley, John , "Comparing Simple Role Based Access Control Models and Access Control Lists", *Proceeding RBAC '97 Proceedings of the second ACM workshop on Role-based access control* http://delivery.acm.org/10.1145/270000/266769/p127-barkley.pdf?key1=266769&key2=2108522921&coll=DL&dl=ACM&CFID=1856933&CFTOKEN=58395003 (Obtained from the internet on Dec. 13, 2010) Aug. 11, 1997 , pp. 127-132.

FreeBSD, "13.8 Groups", *FreeBSD Handbook: Chapter 13 Users and Basic Account Management* http://www.freebsd.org/doc/handbook/users-groups.html (Obtained from the internet on Aug. 25, 2010) No Publication Date Found , 2 pages.

Gorman, Mel , "Understanding the Linux Virtual Memory Manager", http://www.phptr.com/perens 2004 , 748 pages.

IBM, "Concepts, Planning, and Installation Guide", *General Parallel File System, Version 3.1* Apr. 2006 , 144 pages.

IBM "Snapshots Reinvented: IBM XIV Storage System", Sep. 2008 , 17 pages.

IBM, "Welcome to the AIX 6.1 Information Center", http://publib.boulder.ibm.com/infocenter/aix/v6r1/index.jsp?topic=/com.ibm.aix.doc/doc/base/aixinformation.htm (Date Obtained from the Internet Aug. 3, 2010). 1989 , 1 page.

Shepler, S. et al., "NFS version 4 Protocol", *Network Working Group* http://tools.ietf.org/html/rfc3010 (Obtained from the Internet on Aug. 25, 2010) Dec. 2000 , 213 pages.

Sun Microsystems, "Lustre File System: High-Performance Storage Architecture and Scalable Cluster File System", *White Paper* http://www.raidinc.com/pdf/whitepapers/lustrefilesystem_wp.pdf Oct. 2008 , 20 pages.

"U.S. Appl. No. 13/006,618 Office Action", Oct. 22, 2012 , 13 pages.

"U.S. Appl. No. 13/006,618 Final Office Action", May 9, 2013 , 29 pages.

Tivoli, "Architectural overview of a clustered environment", Composite Application Manager for Response Time Tracking, Version 6.0 http://publib.boulder.ibm.com/infocenter/tivihelp/v3r1/index.jsp?topic=%2Fcom.ibm.itcamrtt.doc_6.0%2FITCAMfTT_InstallConfig10.htm Jul. 2006 , 3 pages.

"U.S. Appl. No. 13/006,626 Office Action", Jan. 31, 2013 , 16 pages.

Lindermann, , "Different DSM Types", Retrieved from the Internet< http:/1129.187.1 08.94/dsmweb/en/understand-dsm/technical-dsm-tutoriaiO/different-dsmtypes.html> 2009 , 6 pages.

\* cited by examiner

DOMAINS BASED SECURITY FOR CLUSTERS

BACKGROUND

Embodiments of the inventive subject matter generally relate to the field of computers, and, more particularly, to domain based cluster security.

A cluster is a group of logically connected machines in a networked environment. The connected machines or nodes share storage resources. The nodes of the cluster coordinate to deliver set of services to clients of the cluster. A single node of the cluster can operate as a server or multiple nodes of the cluster can operate as servers ("distributed cluster"). In addition, the cluster can provide a distributed operating system environment with a logical aggregation of operating systems.

An administrator can configure user registry security on a portal to protect a server from unauthorized users. The administrator can configure a stand-alone centralized database user registry or can add centralized database user registries and/or database user registries to the default federated repository. After configuring the user registry, the administrator can add realms for Virtual Portals or a look aside database to store attributes that cannot be stored in the centralized user registry.

SUMMARY

Embodiments include a method comprising determining a first domain identifier indicated in a cluster message responsive to a receiving node receiving the cluster message from a sending node. The first domain identifier identifies a domain which is a representation of an organizational entity. A second domain identifier indicated in an operating system space of the receiving node is determined. The first domain identifier is compared against the second domain identifier. An operation is performed in accordance with the cluster message if the first domain identifier and the second domain identifier match. The cluster message is denied if the first domain identifier and the second domain identifier do not match

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
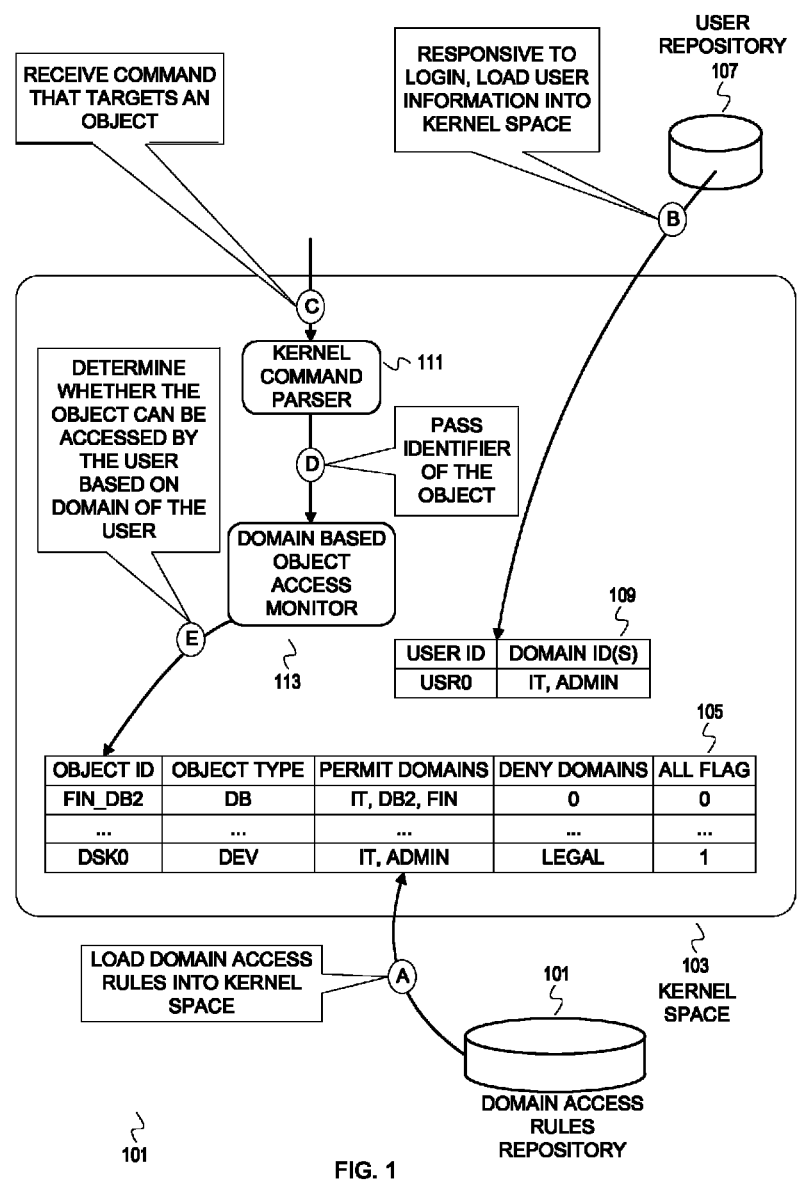
FIG. 1 depicts an example conceptual diagram of a domain based access control enforced in a kernel space.

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

The terms "application," "tool," "utility," and "script are used herein to refer to one or more computer programs. The terms "process" and "instance" are used hereinto refer to an executing computer program or executing part of a computer program. To illustrate, an "operating system instance" refers to an instantiated or executing operating system computer program. A "kernel process" refers to a kernel program or kernel service executing in kernel space. "Kernel space" refers to the execution space of the kernel. The description also uses the term "subject" to refer to executing instances of kernel code, application code, a utility, or a tool.

An operating system ("OS") can support access to objects (e.g., devices, file systems, volume groups, files, etc.) for different departments of an organization and for different purposes (e.g., management of the object, writing to the object, viewing the object, invoking an object, etc.). For instance, an OS can support different applications/systems and data for a legal department, a human resources ("HR") department, and a finance department. The OS can support an electronic mail system for all three departments. The OS can also support a docketing application for the legal department and a bookkeeping application for the finance department. The OS may also support a job application database and employee complaint database for the HR department. An organization may want to isolate the objects for the different departments at a granularity greater than currently available. An administrator can create domains for these different departments to isolate the objects of the departments (e.g., database records, department file systems, etc.) for confidentiality reasons, to conform to organizational task divisions (e.g., different information technology departments may support the different departments), etc.

Functionality can be implemented in an operating system to increase the granularity of isolation for objects. A domain can be defined to represent each of different entities (e.g., different departments or work groups). User identifiers and/or user credentials can be associated with the appropriate domain or domains. For instance, an administrator can configure users as members of particular domains. An administrator can then define a set of rules that govern operation(s) that can be performed on the objects based on the domains. The operations can be in response to commands or instructions from an executing application, executing script, process, etc. Processes or subjects running on a system will inherit the domain or domains of a user account logged into the system. A kernel process, for example, can evaluate the set of rules that specify which domains facilitate access to which objects. When a process or subject attempts to perform an operation on an object (e.g., mount a file system or device, create a volume group, view or write to a file, etc.), the kernel process evaluates the domain inherited by the process, and consequently the operation, and the object against the set of rules to determine whether the operation is permitted to proceed.

FIG. 1 depicts an example conceptual diagram of domain based object isolation enforced in a kernel space. A kernel space 103 comprises a kernel command parser 111 and a domain based object isolation monitor 113. The kernel space 103 represents memory and processes of a kernel on a machine. The kernel command parser 111 represents executing kernel code that parses commands/instructions initiated in user space of the machine hosting the kernel space 103. Although a kernel command parser 111 is not necessarily involved in receiving a command or instruction from user space, FIG. 1 depicts an example involving a command parser to avoid encumbering the description with alternatives.

The machine that hosts the kernel space 103 is communicatively coupled with a user repository 107. The user repository 107 hosts user data (e.g., user credentials, user profiles, etc.) of users that login into the machine. The user data at least includes user identifiers (e.g., usernames, serial numbers, etc.) and associated domains. Each user can be associated with 0 to n domains. When a user is assigned or associated with a domain, the system that manages the user repository 107 updates the corresponding user data to indicate the domain. For instance, a system that supports the creation of domains submits a request to the system that supports the user repository 107 to update a user profile, for example, to indicate a domain. The user repository 107 may be local to the machine that hosts the kernel space 103. The user repository may be distributed throughout a cluster or hosted at a device designated for hosting the user data accessible via a network.

The machine also has access to a domain isolation rules repository 101. The domain isolation rules repository 101 comprises domain isolation rules that indicate which domains are permitted for which objects. A storage device that hosts the domain isolation rules repository 101 can be local or remote with respect to the machine that hosts the kernel space 103.

A root user, super user, or a user with a highest privilege can create domains and domain isolation rules. For instance, a root user can create a domain for IT administrators. The root user can also create a database domain. The root user can define a rule that allows access to manage database objects for users who are assigned to both the IT administrator domain and the database domain. The root user can also define a rule that allows access to manage email objects (e.g., email servers) for users assigned to the IT administrator domain and an "email" domain previously created by the root user.

Defining a domain can comprise establishing an identifier for a domain (e.g., a domain name, a unique numerical identifier, etc.) and a description of the domain. A system that hosts a repository of domains can enforce uniqueness of domain identifiers as unique names and/or generate unique numbers for domains across a node or network. Defining a domain isolation rule comprises indicating an object and a domain(s) that facilitates performance of operation on the object ("permitted domain"). Defining a rule can also comprise specifying a domain that does not facilitate performance of an operation ("denied domain") on the object. For instance, a user may be assigned to an IT domain and a LEGAL domain. A rule may allow a management operation on a particular object if the operation is associated with a user who is a member of the IT domain and an HR domain. A rule may specify that the IT domain is a permitted domain, but the LEGAL domain is a denied domain. Even though the user is a member of the IT domain, an operation associated with the user is not allowed to be performed on an object governed by the rule because the user is also a member of a denied domain. Embodiments can also indicate a flag that represents a constraint of "ANY" or "ALL" domains for an object in a domain isolation rule. If the ALL flag is set in a rule, then an operation associated with a user who is a member of all of the permitted domains indicated in the rule can be performed. Membership in only one of the permitted domains would be insufficient. The ANY or ALL flag can be represented by a single bit or a complex structure. For example, a value of 1 can indicate that ALL domains are required, while a value of 0 can indicate that ANY of the permitted domains is sufficient.

Returning to the example depicted in FIG. 1, a set of domain isolation rules 105 are loaded into the kernel space 103 from the domain isolation rules repository 101 at a stage A. Although embodiments can load all of the domain isolation rules into the kernel space 103, embodiments can also limit loading to a subset of the rules. In addition, the domain isolation rules repository may index or organize rules by various criteria. For example, a set of domain isolation rules can be associated with a particular machine. As another example, domain isolation rules can be loaded after login based on domain membership or credentials of the user that logs into the machine.

At a stage B, user information is loaded into the kernel space 103 from the user repository 107 responsive to a user logging into the machine that hosts the kernel space 103. The user information loaded into the kernel space 103 is instantiated as a user structure instance 109. The user structure instance 109 at least indicates a user identifier and a domain associated with the user represented by the user identifier. In this example, the user identifier is "USR0." The USR0 is a member of the IT domain and the ADMIN domain.

At a stage C, a kernel command parser 111 receives an instruction from user space that targets an object. For example, a user may enter a request to mount a device or increase the size of a filesystem.

At a stage D, the kernel command parser 111 passes an identifier of the object targeted by the instruction to the domain based object isolation monitor 113. For instance, the kernel command parser can call a function that implements the domain based object isolation monitor with the object identifier passed as a parameter. As another example, the kernel command parser 111 can receive a message through a system call which indicates the object identifier to the domain based object isolation monitor 113.

At a stage E, the domain based object isolation monitor 113 determines whether the instruction can be applied to the object (i.e., whether the one or more operations that implement the instruction can be performed on the object) based on the domain(s) of the user associated with the instruction. The domain based object isolation monitor 113 accesses the set of domain isolation rules 105. The set of domain isolation rules 105 indicates an object identifier, an object type, permitted domains, denied or conflict domains, and an ANY or ALL flag. The set of domain isolation rules 105 includes a rule that indicates a database object "FIN_DB2" can be operated upon by an operation(s) associated with any one of the domains IT, DB2, and finance ("FIN"). The set of domain isolation rules 105 also includes a rule that permits access to a device object "DSK0" by an operation(s) associated with a user who is a member of all of the domains IT and ADMIN. Since the USR0 is a member of both the IT domain and the ADMIN domain, a command/instruction that targets the device DSK0 would be allowed to proceed. If the command/instruction targeted the FIN_DB2 object, then the operation(s) that implement the command/instruction would not be permitted to operate upon the FIN_DB2 object.

Although the depicted example refers to a command, embodiments are not so limited. Embodiments can determine whether an operation being performed by an application is permitted to operate upon or access an object. The application would be executing as a process in a user space invoked by a user. The application process inherits the domain of the user. Thus, the corresponding domain identifier of that user would be used to evaluate the set of domain isolation rules against the operation for the object. In addition, embodiments are not limited to specifying particular object identifiers. An administrator can define a rule that governs access to manage types of objects. The administrator could indicate an ANY flag or a wildcard for the object identifier and specify an object type. When the domain based object isolation monitor encounters the wildcard or object identifier ALL flag, then the monitor would evaluate the rule against the type of object that an operation is attempting to operate upon. Further, embodiments are not limited to specifying permitted domains. An embodiment can evaluate a rule that only specifies a denied or conflict domain as allowing all domains not indicated as a denied or conflict domain.

Figure 2:
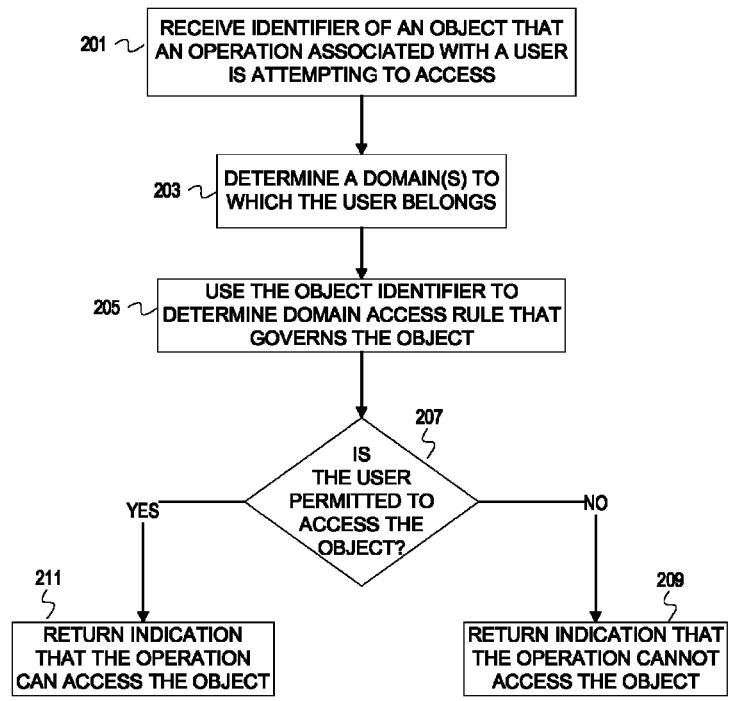
FIG. 2 depicts a flowchart of example operations for evaluating a domain isolation rule for an object.

FIG. 2 depicts a flowchart of example operations for evaluating a domain isolation rule for an object. An object identifier is received that identifies an object on which a system is attempting to perform an operation(s) (201). The object identifier identifies an object that is targeted by a command, an application, an instruction, invoked function, etc. For instance, the user is attempting to modify size of a file system or remove a volume group. As stated earlier, the object identifier may be indicated in a function call, an instruction in an executing script, an operation originating from a utility, an application, etc. The set of one or more operations may be implementing a command or instruction that originates from a command line, application instance, operating system process, background process, etc.

A domain(s) to which the user belongs is determined (203). For instance, the user may be a member of a human resources domain. When user data (e.g., credentials, profile, etc.) that represents a user account logged into a system is loaded, the domain identifier(s) indicated in the user data can be stored at a known or reserved location in the operating system space. When evaluating a domain isolation rule, an operating system process can access the known or reserved operating system space location for the domain identifier(s).

The object identifier is used to determine a domain isolation rule that governs the object (205). A set of domain isolation rules can be indexed by object identifiers. For instance, a kernel process locates a domain isolation rule using the object identifier as an index.

It is determined if the operation being attempted can be performed on the object based on domain membership (207). A kernel process evaluates the located domain isolation rule for the object and determines whether the domain of the user is indicated as a permitted domain. The kernel process may also determine whether the rule indicates that a user is required to be a member of all indicated permitted domains, or if the user is a member of a denied or conflict domain. If operation is permitted to be performed on the object, then operations continue at block 211. If operation is not permitted to be performed on the object, then operations continue at block 209.

An indication is returned that the operation is not permitted to be performed on the object if the user is determined to be a member of a denied domain or is not a member of a permitted domain (209). If the user is not a member of a permitted domain, then the operation initiated by or associated with the user cannot be carried out. A denied indication can be returned to the invoking code (e.g., a command parser). A notification can then be displayed that access is not permitted. For example, an error message can be displayed.

If the user credentials indicate a domain membership that satisfies the domain isolation rule for the object, then an indication is returned that the operation can be performed on the object (211). For instance, an allow indication is returned to a command parser, which allows the operation to be carried out.

The depicted flowchart is intended to aid in understanding the inventive subject matter, and should not be used to limit embodiments. Embodiments can perform additional operations, fewer operations, operations in a different order, operations in parallel, etc., than depicted herein. For instance, an indication may not be returned that an operation is not permitted access to an object. The executing code that evaluates the domain isolation rule may invoke an error handler or generate the deny message itself. Further, the domain isolation rules may not be indexed by object identifier. The domain isolation rules can be indexed by object type and then by object identifier. Hence, the rule evaluation code would determine the type of the object and initially access the domain isolation rules with the object type.

Domain based isolation of objects can be used in a system or an operating system that also implements a role based access control environment. Domain based isolation can provide an additional layer of control/security at a different degree of granularity than role based access. The use of domain based object isolation within a role based access control (RBAC) environment provides greater configuration flexibility. To illustrate, a user A may be associated with an administrator role. The administrator role is configured to allow performance of operations to mount devices and/or filesystems. The user A, in this illustration, is a member of a domain FINANCE. A root user configured a set of domain isolation rules to indicate the FINANCE domain as a permitted domain for a device DSK1, and to indicate a domain HR as a permitted domain for a device DSK2. If the user A attempts to mount the device DSK1, the operating system will allow the operation(s) to mount DSK1 to proceed. If the user A attempts to mount the device DSK2, the operating system will enforce the domain isolation rule for DSK2 and not allow the user A to mount DSK2. Hence, an organization can restrict operations, which are performed by a system responsive to commands and/or instructions, based on roles, and isolate objects based on domains. The permutation of domains and roles provides an organization with substantial flexibility to secure and manage resources. Embodiments can implement role based access control with domain based object isolation differently. For instance, role of a user can be evaluated before proceeding to evaluate a corresponding domain isolation rule. Alternatively, a domain isolation rule can be evaluated before evaluating role. In addition, a domain isolation rule can be evaluated in parallel with role of a user.

Furthermore, maintenance type operations are not depicted in the above figures. Embodiments can regulate removal of a domain from a node or machine based on disassociation from the associated object. Embodiments may regulate disassociation of domains from objects or removing of domain identifiers from domain isolation rules to avoid unintended release of an object from domain isolation. For example, a system may prevent a domain isolation rule from being modified to remove a domain A, unless other domains are specified. So, a domain PAYROLL could be disassociated from an object DSK0, as long as the domain PAYROLL is not the sole domain associated with the object DSK0. When attempting to remove an object, an interface can be displayed that indicates all domains associated with the object. The interface can allow an administrator to disassociate each of the domains from the object to allow removal of the object. Embodiments, however, are not constrained to preventing removal of objects until domain disassociation. In addition, domain isolation rules can be automatically updated or manually updated when a domain is removed. For instance, a repository of domains with their descriptions such as domain names and domain ids can be maintained. When an attempt is made to delete a domain, the maintenance code can provide some indication of the objects and/or domain isolation rules associated with the domain. A prompt can be displayed to confirm that the domain should be disassociated from the objects and removed from the domain isolation rules.

Domains can also be used to secure resources of a cluster. An administrator can configure a node of a cluster (e.g., a physical server, a virtual server, a storage resource, etc.) as a member of a particular domain. Membership in a cluster can be restricted to nodes that are members of the particular domain. For instance, an administrator can select a domain identifier from a list of identifiers of previously created domains or enter a domain identifier. When a node generates a cluster message (e.g., a command message), a kernel process or operating system process of the node will indicate the domain(s) of the node in the cluster message. Packets that are exchanged or sent across nodes in the cluster may also indicate domains(s). The cluster message can be a command message to read or write to a storage resource of the cluster. When the cluster storage resource node (e.g., storage area network device) or node that controls the storage resource (e.g., local disk of a server, partition, logical unit identifier (LUN), etc.) receives the command message, the node will examine the command message to ensure the message indicates a domain that aligns with the cluster (i.e., a domain that matches the domain of the storage resource node or node that controls the storage resource). If the proper domain is indicated in the command message or packets, then the command message or packet is processed. Otherwise, the command message is denied or the packet is dropped.

Figure 3:
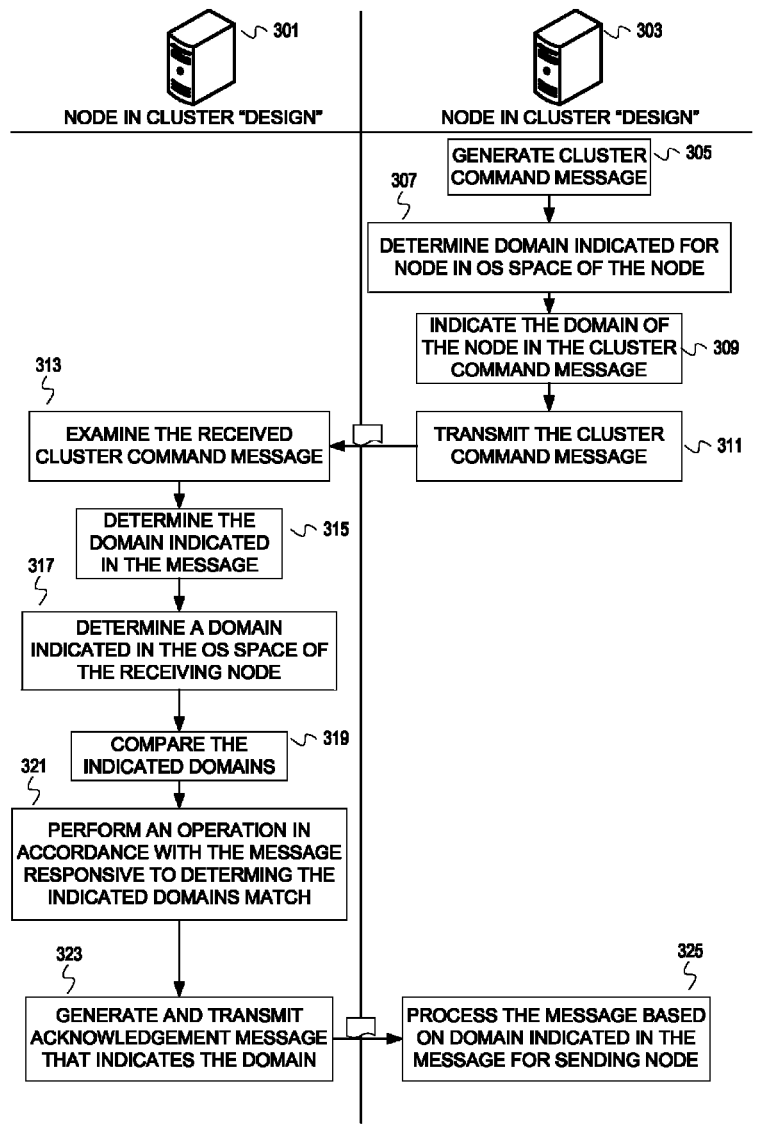
FIG. 3 depicts a diagram of example operations and communications for domain based cluster security.

FIG. 3 depicts a diagram of example operations and communications for domain based cluster security. FIG. 3 depicts communications between two nodes 301, 303 that are members of a "DESIGN" domain. The node 303 generates a cluster command message (305). The cluster command message can be a command to read data from or write data to a storage resource (e.g., disk, partition, logical unit number, etc.), which can be local to the node 301 or controlled by the node 301. The cluster command message can also be a request to leave the cluster, a synchronization command, a status message, a configuration command message, etc.

The node 303 determines a domain specified for the node 303 in the operating system space of the node 303 (307). Either as part of generating the cluster command message, prior to generating the message, or subsequent to generating the message, a kernel process of the node 303, for example, reads a memory location owned by the operating system that indicates one or more domains designated for the node 303. The depicted example presumes that the node 303 determines the domain after generating the cluster command message. A standalone node with some domain(s) can send a command message to join a cluster as well.

The node 303 indicates the determined domain in the cluster command message (309). For example, the node writes a domain identifier into a header of the cluster command message. An example command message can include a header as follows:

| Cluster Command | Command Port Destination | Command Port Source | Command Sequence | Source | Destination | domid |
|---|---|---|---|---|---|---|

The node 303 can write the domain identifier of the domain "DESIGN" into the field "domid." The domain identifier can be a string, a structure, an integer unique among domain integer identifiers, a hash of a cluster identifier and the domain identifier, an index into a domain database, etc. After the cluster command message is complete, the node 303 transmits the message to the node 301 (311). The above example header can be implemented, for example, with a structure as follows:

```
typedef struct clusthdr {
    clustcmd_t cmd;
    u_int16_t cmd_port_dst;
    u_int16_t cmd_port_src;
    u_int32_t true_size;
    clustseq_t cmd_seq;
    clustid_t cmd_src;
    clustid_t cmd_dst;
    u_char cmd_data[1];
    domain_t cmd_domain;
} clusthdr_t, *clusthdr_p;
```

The node 301 examines the cluster command message (313). For instance, the node 301 reads the header before parsing the body of the cluster command message. With examination of the message, the node 301 determines the indicated domain (i.e., the node 301 reads the domain identifier that corresponds to the domain "DESIGN") (315).

The node 301 also determines a domain indicated for the node 301 in the operating system space of the node 301 (317). For instance, a kernel process of the node 301 reads a memory location owned by the operating system space known to host a domain specified for the node 301 for cluster security purposes.

The node 301 then compares the domain specified for the node 301 against the domain indicated in the cluster command message (319). In this case, both nodes have been designated as belonging to the "DESIGN" domain for cluster security. Hence, the nodes 301, 303 will accept messages from each other.

The node 301 performs an operation(s) in accordance with the cluster command message responsive to determining the indicated domains match (321). For instance, the node 301 performs a read or a write as indicated in the cluster command message.

After the operation(s) is completed, the node 301 generates and transmits an acknowledgement ("ACK") message that indicates the domain of the node 301 (323). For instance, a kernel process of the node 301 performs operations to generate the ACK message and write the DESIGN domain identifier into the corresponding field of the header. The kernel process can read the domain identifier from a known memory location in the OS space as in block 317. Embodiments can also cache the domain in anticipation of exchanging subsequent messages with the node 303.

The node 303 receives the ACK message, and processes the ACK message based on the domain indicated in the ACK message for the sending node 301 (325). For example, a kernel process of the node 303 compares domains of the node 301 and the node 303. Embodiments can read the domain designated for the node 303 from a known memory location of the OS or from a cache in anticipation of exchanging several cluster messages. Embodiments do not necessarily utilize ACK messages. Embodiments can allow operations to proceed once verification is successful based on a governing node's rules, and the message receiving end is accepted.

Figure 4:
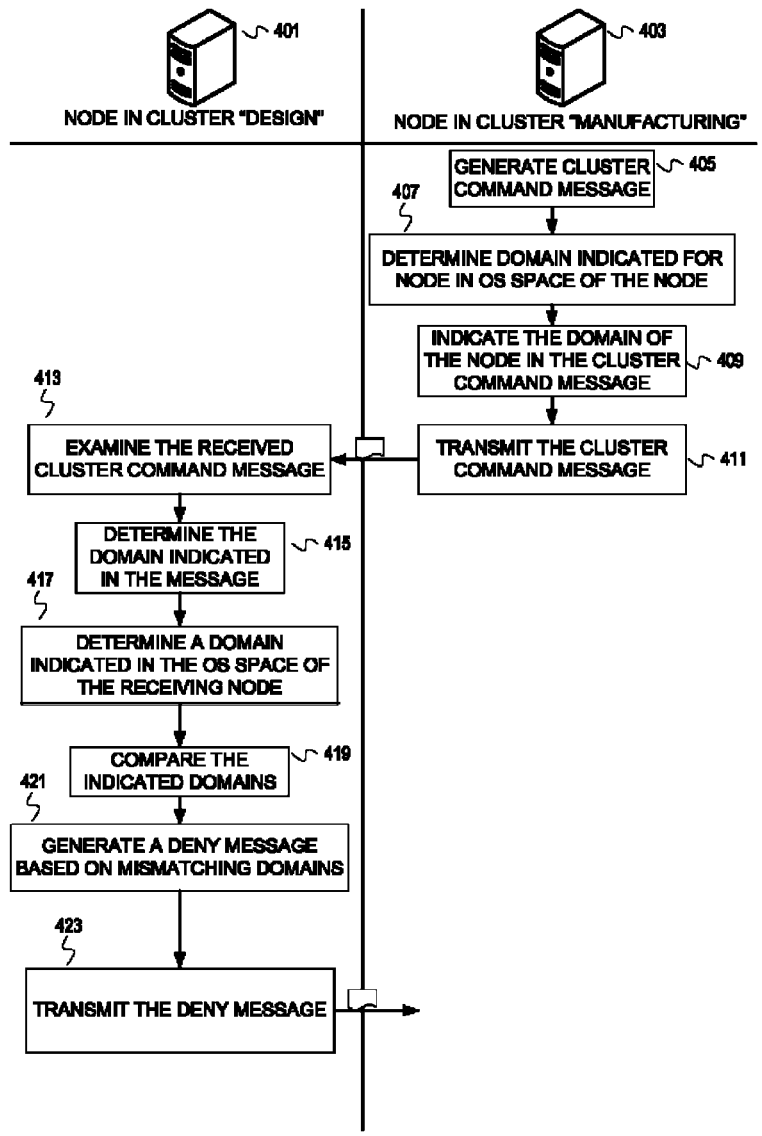
FIG. 4 depicts an example diagram of example operations and communications for domain based cluster security between nodes of different domains.

FIG. 4 depicts an example diagram of example operations and communications for domain based cluster security between nodes of different domains. FIG. 4 depicts communications between two nodes 401, 403 that are members of a "DESIGN" domain and a "MANUFACTURING" domain, respectively. The node 403 generates a cluster command message (405). The cluster command message can be a command to read data from or write data to a storage resource (e.g., disk, partition, logical unit number, etc.), which can be local to the node 401 or controlled by the node 401. The cluster command message can also be a request to join the cluster of the node 401, a synchronization command, a status message, a configuration command message, etc.

The node 403 determines a domain specified for the node 403 in the operating system space of the node 403 (407). Either as part of generating the cluster command message, prior to generating the message, or subsequent to generating the message, a kernel process of the node 403, for example, reads a memory location owned by the operating system that indicates one or more domains designated for the node 403. The depicted example presumes that the node 403 determines the domain after generating the cluster command message.

The node 403 indicates the determined domain in the cluster command message (409). For example, the node writes a domain identifier into a header of the cluster command message.

The node 403 can write the domain identifier of the domain "MANUFACTURING" into the field "domid" as in the example header described above. The domain identifier can be a string, a structure, an integer unique among domain integer identifiers, a hash of a cluster identifier and the domain identifier, an index into a domain database, etc. After the cluster command message is complete, the node 403 transmits the message to the node 401 (411).

The node 401 examines the cluster command message (413). For instance, the node 401 reads the header before parsing the body of the cluster command message. With examination of the message, the node 401 determines the indicated domain (i.e., the node 401 reads the domain identifier that corresponds to the domain "MANUFACTURING") (415).

The node 401 also determines a domain indicated for the node 401 in the operating system space of the node 401 (417). For instance, a kernel process of the node 401 reads a memory location owned by the operating system space known to host a domain specified for the node 401 for cluster security purposes.

The node 401 then compares the domain specified for the node 401 against the domain indicated in the cluster command message (419). In this case, both nodes have been designated as belonging to the different domains "DESIGN" and "MANUFACTURING" for cluster security. Hence, the nodes 401, 403 will not accept messages from each other.

The node 401 generates a deny message based on the mismatching domains (421). The node 401 then transmits the deny message to the node 403. The deny message does not specify a domain. So, the node 403 can read the deny message. Embodiments can communicate a reason for the denial and/or the domain of the denying node. Embodiments may not generate a deny message, and allow a timeout mechanism or something similar to inform a node that a cluster message has been denied. Embodiments do not necessarily generate a deny message. Embodiments can drop messages or packets and deny a corresponding operation if a mismatch of domains is determined.

Domain based cluster security can be used to divide nodes of a cluster by domains without use of resource intensive techniques (e.g., installing and configuring firewalls) and without creating different clusters. If a cluster has already been created, then an administrator can isolate nodes and/or resources of the cluster based on domains. The administrator can configure the nodes and/or resources to be associated with particular domains while being within a same cluster. An administrator can designate some nodes of a cluster as being associated with multiple domains.

Although a same database or repository of domains can be used for cluster security and object access control, embodiments can use different databases of domains for cluster security and for object access control. For example, a node may have user credentials that indicates domain A loaded into operating system space. The same node can also have domain A designated for the node itself within the operating system space. Thus, domain A is indicated separately within operation system space for cluster security and for object access control. Essentially, the domain is associated with the user in one context and with the node in the other context. Embodiments can indicate different domains or overlapping domains for the different context (i.e., the cluster security context and the object access control context). For example, the operating system space of a node can indicate domain A as associated with a user logged into the node and can indicate domain B as associated with the node. As another example, the operating system space of a node can indicate domain A and domain B as associated with a user logged into the node, and can indicate domain B and domain C as associated with the node.

In addition, an administrator can create different or overlapping sets of domains for cluster security and for object access control. For example, an administrator can create domains IT, ACCOUNTING, and SALES for object access control. The administrator can associate users with the object access control domains, and can define rules for accessing objects based on the domains of users. In some cases, an object corresponds to a node in a cluster. Different users can have various domains associated with them, and the various domains can be a subset of domains defined for the node. The administrator can also create the domains IT1, IT2, ACCOUNTING, SALES1, and SALES2 for cluster security. The identifiers and descriptions of these domains can be maintained in separate databases, a unified database, etc. For instance, the ACCOUNTING domain identifier and domain description can be the same database entry regardless of whether it is being used to control access to objects or used for cluster security. Alternatively, different entries and/or different databases can be maintained for the created domains based on purpose of the domain.

The depicted flowcharts are intended to aid in understanding the inventive subject matter, and should not be used to limit embodiments. Embodiments can perform additional operations, fewer operations, operations in a different order, operations in parallel, etc., than depicted herein. For instance, an indication may not be returned that an operation is not permitted access to an object. The executing code that evaluates the domain access rule may invoke an error handler or generate the deny message itself. Further, the domain access rules may not be indexed by object identifier. The domain access rules can be indexed by object type and then by object identifier. Hence, the rule evaluation code would determine the type of the object and initially access the domain access rules with the object type. With respect to FIG. 3, the operations depicted in blocks 315 and 317 can be performed in a different order or in parallel. In addition, additional operations can be performed to implement the ANY or ALL type of functionality of object access control for cluster security. For example, an administrator can associate a node with multiple domains, and configure the node to deny messages that do not indicate all of the domains associated with the node in a cluster. Or the administrator can configure the node to accept a cluster message as long as one of the multiple domains associated with the node are indicated in the cluster message.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
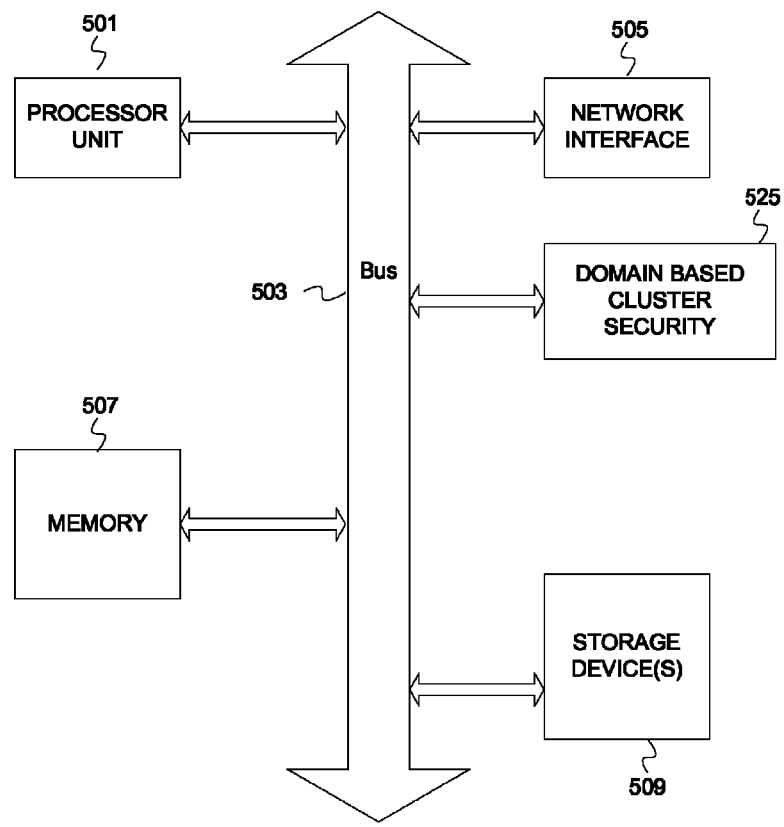
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system also comprises a domain based cluster security module 525. The domain based cluster security module 525 examines cluster messages, and denies or accepts the messages based on the domains indicated in the cluster messages and the domain of the computer system. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. In addition, the domain based cluster security module 525 can be embodied in kernel code or operating system code that is hosted in the system memory 507 and/or the storage device(s) 509. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for isolating or securing nodes and/or resources based on associated or indicated domains as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   loading domain access rules into operating system space of a receiving node, wherein the domain access rules include a plurality of entries each of which indicate an object, permitted domains for the object, denied domains for the object, and a flag, wherein the flag indicates whether membership in all of the permitted domains is required for the corresponding object;
   loading a domain database into the operating system space of the receiving node, wherein the domain database indicates a plurality of domains and user membership in the domains;
   determining an object and a user indicated in a cluster message, a user indicated in the cluster message, and an object indicated in the cluster message responsive to the receiving node receiving the cluster message from a sending node, wherein each of the one or more domains is a representation of an organizational entity;
   determining, with the domain database, that the user indicated in the cluster message is member of one or more domains of the plurality of domains;
   determining that a first entry of the plurality of entries in the domain access rules indicates the object in the cluster message;
   determining whether the first entry has the flag set;
   performing an operation in accordance with the cluster message if the one or more domains in which the user is a member includes all of the permitted domains of the first entry and the flag is set in the first entry; and
   denying the cluster message if the one or more domains in which the user is a member does not include all of the permitted domains of the first entry and the flag is set in the first entry.

2. The method of claim 1, wherein said determining the object and the user indicated in the cluster message comprises examining a header of the cluster message, wherein the header comprises a field to indicate the user.

3. The method of claim 1, wherein said denying the cluster message comprises at least one of generating a deny message and dropping the cluster message.

4. The method of claim 3, wherein said generating the deny message comprises generating the deny message without an indication of the permitted domains in a header of the deny message.

5. The method of claim 1, wherein said receiving node comprises one of a physical server, a virtual server, and a cluster storage resource node.

6. A computer program product for domain based cluster security the computer program product comprising:
   a computer readable storage medium having computer usable program code embodied therewith, the computer usable program code executable by a cluster node to cause the cluster node to perform operations comprising:
      loading domain access rules into operating system space of the cluster node, wherein the domain access rules include a plurality of entries each of which indicate an object, permitted domains for the object, denied domains for the object, and a flag, wherein the flag indicates whether membership in all of the permitted domains is required for the corresponding object;
      loading a domain database into the operating system space of the cluster node, wherein the domain database indicates a plurality of domains and user;
      determining an object and a user indicated in a cluster message, a user indicated in the cluster message, and an object indicated in the cluster message responsive to the receiving node receiving the cluster message from a sending node, wherein each of the one or more domains is a representation of an organizational entity;
      determining, with the domain database, that the user indicated in the cluster message is member of one or more domains of the plurality of domains;
      determining that a first entry of the plurality of entries in the domain access rules indicates the object in the cluster message;
      determining whether the first entry has the flag set;
      performing an operation in accordance with the cluster message if the one or more domains in which the user is a member includes all of the permitted domains of the first entry and the flag is set in the first entry; and
      denying the cluster message if the one or more domains in which the user is a member does not include all of the permitted domains of the first entry and the flag is set in the first entry.

7. The computer program product of claim 6, wherein said determining the object and the user indicated in the cluster message comprises examining a header of the cluster message, wherein the header comprises a field to indicate the user.

8. The computer program product of claim 6, wherein said denying the cluster message comprises at least one of generating a deny message and dropping the cluster message.

9. The computer program product of claim 8, wherein said generating the deny message comprises generating the deny message without an indication of the permitted domains in a header of the deny message.

10. An apparatus comprising:
    a processor;
    a network interface operable to send and receive cluster messages; and
    a computer readable storage medium having computer usable program code embodied therewith, the computer usable program code executable by the processor to cause the apparatus to,
       load domain access rules into operating system space of the cluster node, wherein the domain access rules include a plurality of entries each of which indicate an object, permitted domains for the object, denied domains for the object, and a flag, wherein the flag indicates whether membership in all of the permitted domains is required for the corresponding object;

load a domain database into the operating system space of the cluster node, wherein the domain database indicates a plurality of domains and user;

determine an object and a user indicated in a cluster message, a user indicated in the cluster message, and an object indicated in the cluster message responsive to the receiving node receiving the cluster message from a sending node, wherein each of the one or more domains is a representation of an organizational entity;

determine, with the domain database, that the user indicated in the cluster message is member of one or more domains of the plurality of domains;

determine that a first entry of the plurality of entries in the domain access rules indicates the object in the cluster message;

determine whether the first entry has the flag set;

perform an operation in accordance with the cluster message if the one or more domains in which the user is a member includes all of the permitted domains of the first entry and the flag is set in the first entry; and deny the cluster message if the one or more domains in which the user is a member does not include all of the permitted domains of the first entry and the flag is set in the first entry.

11. The apparatus of claim 10, wherein the computer usable program code being executable by the processor to cause the apparatus to determine the object and the user in the cluster message comprises computer usable program code executable by the processor to cause the apparatus to examine a header of the cluster message, wherein the header comprises a field to indicate the user.

12. The apparatus of claim 10, wherein the computer usable program code being executable by the processor to cause the apparatus to deny the cluster message comprises computer usable program code executable by the processor to cause the apparatus to perform at least one of generate a deny message and drop the cluster message.

13. The apparatus of claim 12, wherein the computer usable program code being executable by the processor to cause the apparatus to said generate the deny message comprises computer usable program code executable by the processor to cause the apparatus to generate the deny message without an indication of the permitted domains in a header of the deny message.

* * * * *